United States Patent
Oettle

(10) Patent No.: US 7,396,196 B2
(45) Date of Patent: Jul. 8, 2008

(54) CUTTING MACHINING TOOL

(75) Inventor: Matthias Oettle, Riederich (DE)

(73) Assignee: Hartmetall-Werkzeug Fabrik Paul Horn GmbH., Tübingen (DE)

( * ) Notice: Subject to any disclaimer, the term of this patent is extended or adjusted under 35 U.S.C. 154(b) by 585 days.

(21) Appl. No.: 10/516,413

(22) PCT Filed: Jun. 16, 2003

(86) PCT No.: PCT/EP03/06320

§ 371 (c)(1),
(2), (4) Date: Dec. 2, 2004

(87) PCT Pub. No.: WO2004/020130

PCT Pub. Date: Mar. 11, 2004

(65) Prior Publication Data

US 2005/0220552 A1  Oct. 6, 2005

(30) Foreign Application Priority Data

Aug. 28, 2002 (DE) .............................. 102 39 422

(51) Int. Cl.
*B23B 29/04* (2006.01)
(52) U.S. Cl. .................. 408/239 R; 407/110
(58) Field of Classification Search .............. 408/226, 408/238–240; 279/44–45, 42, 48, 52; 409/232, 409/234; 407/101, 102, 107, 109, 110; *B23B 31/20*
See application file for complete search history.

(56) References Cited

U.S. PATENT DOCUMENTS

| 205,400 | A | * | 6/1878 | Knowles | 279/42 |
| 339,544 | A | * | 4/1886 | Graham | 408/226 |
| 964,922 | A | * | 7/1910 | Lewthwaite | 279/49 |
| 974,896 | A | * | 11/1910 | Leland | 279/56 |
| 1,075,699 | A | * | 10/1913 | Dechnik | 279/42 |
| 1,765,362 | A | | 6/1930 | Berry | |
| 2,141,786 | A | * | 12/1938 | Helgerud | 408/140 |

(Continued)

FOREIGN PATENT DOCUMENTS

DE    41 02 529 A1    7/1992

(Continued)

*Primary Examiner*—Daniel W Howell
(74) *Attorney, Agent, or Firm*—Roylance, Abrams, Berdo & Goodman, L.L.P.

(57) ABSTRACT

A cutting machining tool, especially of a boring bar type, has a holding device (10), one end of which is provided with a fixing shaft while its other end is provided with a seat (12) for a removable cutting member (16). The cutting member encompasses a support part (18) which engages at least partly into the seat (12) in the fixed state and a machining part (20). The support part (18) can be fixed in a clamping manner in the seat (12) by a fastening part (22). The seat (12) is provided with a rest area (28). The cutting member can be securely fixed in the seat across a larger fixing range by a support part due to the fact that the seat (12) includes a delivery area (30) in addition to the rest area (28). The two areas (28, 30) are movable towards or away from each other so as to fasten or remove the cutting member (16) by the fastening part (22). Secure fixing and support is achieved by three planar areas that are located on the outer circumference of the support part.

18 Claims, 2 Drawing Sheets

U.S. PATENT DOCUMENTS

| | | | |
|---|---|---|---|
| 2,989,315 A * | 6/1961 | Harrist | 279/42 |
| 5,938,212 A * | 8/1999 | Wadsworth | 279/42 |
| 5,997,012 A * | 12/1999 | Brian | 279/43.5 |
| 6,880,832 B2 * | 4/2005 | DeRosa | 279/44 |
| 7,097,396 B1 * | 8/2006 | Miyanaga | 408/144 |

FOREIGN PATENT DOCUMENTS

| | | | |
|---|---|---|---|
| DE | 4316799 A1 * | 7/1994 | |
| DE | 100 52 016 A1 | 5/2002 | |
| FR | 1 497 546 A | 10/1967 | |
| GB | 598240 A | 2/1948 | |
| GB | 2228695 A * | 9/1990 | |

* cited by examiner

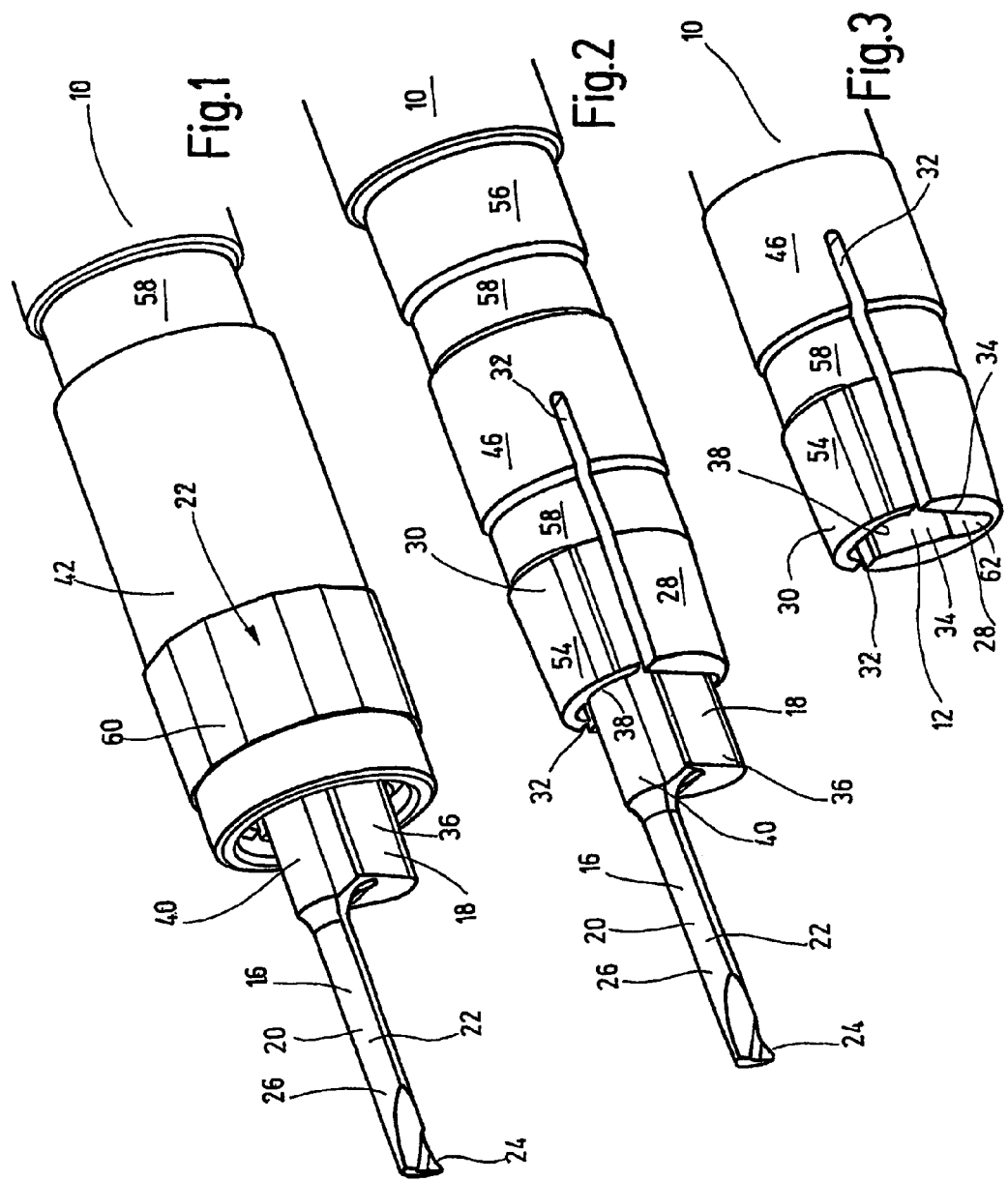

CUTTING MACHINING TOOL

FIELD OF INVENTION

The present invention relates to a tool for cutting machining, in particular one in the form of a drill rod, having a holder. One holder end has a fastening shank. The other end has a seat for a replaceable cutting element. A supporting component is at least partly engaged in the seat in the fastened state. With a machining component, it is possible to fasten the supporting component by clamping in the seat by a fastening component.

BACKGROUND OF THE INVENTION

DE 41 02 529 A1 discloses a tool holder for rotating cutting tools, especially ones having a rod extending in the direction of the axis of rotation and introducible into a tool seat of a chuck, and having a cutting element mounted eccentrically on one end of the rod. The tool seat is eccentricity adjustable relative to the axis of rotation being mounted for adjustment of the operating radius of the cutting tool. For this purpose, there is mounted in an external bushing of the tool holder a circular opening eccentric from the axis of this bushing. In this opening, an interior bushing has an adjustable-rotation seat eccentric relative to the central axis of the opening for the cutting tool. The extent of the eccentricity between the seat for the cutting tool and the central axis of the opening in the exterior bushing in which the interior bushing is seated is more or less as great as the extent of the eccentricity between the central axis of the opening referred to and the exterior bushing. With the tool holder as disclosed, it is possible only to exchange a cutting element mounted on a rod for it by the holder in the form of a chuck, while the cutting element itself is mounted conventionally, eccentrically, on the free frontal surface of the rod which may be introduced into the chuck. Because of the large number of components, this tool holder as disclosed is complex in structure and accordingly expensive. Consequently, high-precision machining with that holder also is not possible.

Another tool is disclosed by DE 100 52 016 A1. The tool disclosed is used in particular for rotary milling and has as holder a shaft defining the axis of rotation. This holder may be coupled to a rotary drive, and has on its free end a headpiece to which a cutting element may be detachably connected in a mounting configuration in which the cutting edge of the cutting element is positioned at a radial distance from the axis of rotation corresponding to a desired cutting circle diameter. A supporting component on the headpiece performing the function of half-element of the cutting element is mounted so as to be rotatable around an adjustment axis which extends in parallel with the axis of rotation of the shaft and is offset eccentrically from this axis. It is possible to mount the cutting edge of the cutting element as a machining component offset a certain radial distance from the axis of adjustment. In addition, in the case of the solution disclosed, a stop mechanism is present by which the cutting element component may be locked with the headpiece in selected rotary positions which correspond to the diameter of the cutting circle diameter desired of the cutting edge of the cutting element.

In the case of the tool disclosed, the seat has convergent support surfaces of a support area which may be brought into contact with correspondingly convergent contact surfaces of the supporting component. A clamp connection is used to fasten the supporting component in the seat of the holder, there being provided as fastening component a hexagon socket screw which extends through the exterior circumferential wall of the seat in the holder. The machining component presses against the support surfaces of the support area of the seat. Although this configuration permits very good adjustment of the cutting component in the holder, it is desirable as a prerequisite for high-precision machining with the cutting element that the fastening be even further improved in order that high-precision machining may be achieved.

FR-A-1497 546 discloses a generic tool for machining by cutting having a holder with a fastening shank on one of its ends and on the other end a seat for a replaceable cutting element with a supporting component which is engaged at least partly in the seat when in the fastened state, and having a machining component. It is possible to fasten the supporting component in the seat by clamping by a fastening component. In the case of the disclosed solution, the shaft of the supporting component is cylindrical in configuration and may be fastened in a cylindrical seat by a fastening component which is integrated with the remainder of the seat by a slot guide and which may be tightened by a screw connection in the direction of the supporting component for the purpose of fastening the latter. As a result, there necessarily is a slight displacement of the axes of rotation of holder and supporting component which cannot be effectively offset in that there are inside the cylindrical seat three webs projecting into the seat space, the purpose of which is to permit center adjustment. High-precision machining with the tool is not possible. Comparable considerations also apply to the generic tool disclosed in GB 598 240 A.

U.S. Pat. No. 1,765,362 discloses clamping of the respective tools by a clamping or fastening sleeve in the case of a holder for drilling tools. The cylindrical seat has a plurality of slots in the direction of the fastening shank in diametrically opposite directions relative to the longitudinal axis. Thus, the tools may be clamped by screwing the fastening sleeve onto an external threading of the slotted fastening area of the drill on its shaft-like supporting component. The slotted guide necessitates fastening of the slotted fastening area of the cylindrical drill shaft by four elastic tongue areas in adjustment of the fastening sleeve. This in turn results in overevaluation of the fastening state for the supporting component and accordingly in displacement of the corresponding positions of the longitudinal axes of holder and drilling tools, something which in its turn results in machining inaccuracies.

SUMMARY OF THE INVENTION

An object of the present invention is, for the purpose of high-precision machining, to effect targeted absorption of vibrations in the cutting element by the holder of the tool, and thus, to offset them and at the same time to provide a cost-effective and reliably operating fastening capability for the cutting element.

This object is basically attained with a tool for machining by cutting where the support area has support surfaces convergent toward each other which may be brought into contact with surfaces on the supporting component configured to be correspondingly convergent. The adjustment area with its adjustment surface extends transversely to the support surfaces of the support area, and thus, acts on another contact surface on the supporting component. The fastening component has a fastening sleeve with internal threading which may be screwed onto an external threading of the holder with which the respective slots of the sleeve communicate. The interior hexagonal threading, as disclosed in DE 100 52 016 A1 involving point-by-point introduction of force for the process of fastening the cutting element in the seat of the holder, is being replaced by a two-dimensional support with partly convergent support surfaces and the movable adjustment area of the seat. Hence, the cutting element may be fastened more reliably in the seat over a larger fastening area by a supporting component. On the whole, reliable fastening and support are achieved on the basis of three surface areas, in contrast to the indefinite contact situation obtained with four flexible contact tongues which may be adjusted and fastened by clamping by a fastening sleeve in accordance with the technical teaching of U.S. Pat. No. 1,765,362. In machining with the machining component, it would be possible to effect targeted dissipation of vibrations which occur into the holder by broad surface areas, so that tolerances are largely eliminated on the basis of the improved support and contact situation.

The configuration of the present invention ensures two-dimensional contact by the mutually convergent support surfaces, so that force is introduced into the holder over broad areas and the adjustment surface presses the supporting component of the cutting elements in the form of a wedge in the direction of the convergent support surfaces inside the seat of the holder. As a result of this configuration, canting or oblique introduction of clamping forces such as is encountered in the disclosed solution, such as that in FR-A-1 497 546, is reliably prevented.

The tool of the present invention may be used as a rotating machine tool such as a milling tool or drill rod. It is also possible, however, to configure a rotating tool in which the tool itself remains stationary and the workpiece then rotates along a machining axis opposite the stationary tool. Relative movements of tool and workpiece for a special machining process are also possible. In this instance the cutting element preferably is configured as a conventional replaceable hard metal cutting tool, such as that disclosed in DE 100 52 016 A1, for example.

By preference provision is also made such that the fastening sleeve, when screwed onto the external threading, forms a clamping surface narrowing as it converges toward the machining component of the cutting element. This clamping surface interacts with a corresponding narrowing circumferential surface of the seat engaged in the slots in the seat. The fastening sleeve makes it possible for the movement of adjustment of the adjustment area to the support area to be effected with application of little force by this fastening sleeve. It also is possible to carry out the respective fastening process manually by screwing the fastening sleeve onto the holder by the corresponding threading. The clamping may then be released by unscrewing of the fastening sleeve and removal of the cutting element by hand from the holder by the supporting component. In the process, the fastening sleeve may remain on the holder. Preferably, however, the possibility also exists of fastening or releasing the fastening sleeve, in the manner described, by force application points on the external circumference of this sleeve by a conventional handling tool such as a wrench.

In one especially preferred embodiment of the tool of the present invention, at least the interior surface of the adjustment area facing the supporting component of the cutting element has in its longitudinal direction a convex clamping surface designed to be crowned. Consequently, any canting of the tool in the longitudinal direction inside the seat may be eliminated by the convex clamping surface. It accordingly also is possible to increase the clamping force to be applied.

In another preferred embodiment of the tool of the present invention, the fastening sleeve rests in its central area on the external threading of the seat by its internal threading. At its free end, both on the front external circumference of the seat and on the frontal area of the holder, the rear area of the holder ends in a fastening shank. The fastening sleeve is accordingly additionally supported at its front and its rear ends, and the forces introduced into the cutting edge of the cutting element during machining may accordingly be dissipated by the seat into the fastening sleeve, which provides a reliable buttress for the forces introduced because of the large number of support options.

In another especially preferred embodiment of the tool of the present invention, the adjustment surface of the adjustment area is curved to be concave, and the curvature of the other contact surface of the supporting component of the cutting element is designed to be more greatly convex than the concave curvature of the adjustment surface with which the supporting component interacts. Consequently, in the longitudinal direction of the tool, in addition to the possibility of contact designed to be crowned referred to above by the curved surfaces, a self-adjusting clamping force is achieved in the direction of the convergent support surfaces of the support area inside the seat in the holder.

By preference, provision is made such that the convergent support surfaces of the support area are interconnected at their facing ends by a connecting area. The wall thickness of it is smaller than the wall thicknesses selected for the support area in the area of its support surfaces. There is thus obtained elastic behavior of introduction of the clamping forces by the connecting area over the support area, with a corresponding restoring force as soon as the cutting element has been fastened in the seat by its supporting component. By preference, provision is also made such that the seat is made up in cross-section to the extent more or less of two-thirds of the support area and to the extent of one-third of the adjustment area.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a perspective view, drawn on a scale of 4:1, of the frontal side of a tool, according to an embodiment of the present invention with the cutting element and the sleeve fastened on the holder;

FIG. 2 is a perspective view, drawn on a scale of 4:1, of the frontal area of the tool of FIG. 1 with the cutting element introduced into the holder without fastening sleeve;

FIG. 3 is a perspective view, drawn on a scale of 4:1, of the frontal area of the holder of the tool of FIG. 1 without fastening sleeve and without cutting element;

DETAILED DESCRIPTION OF THE INVENTION

Figure 4:
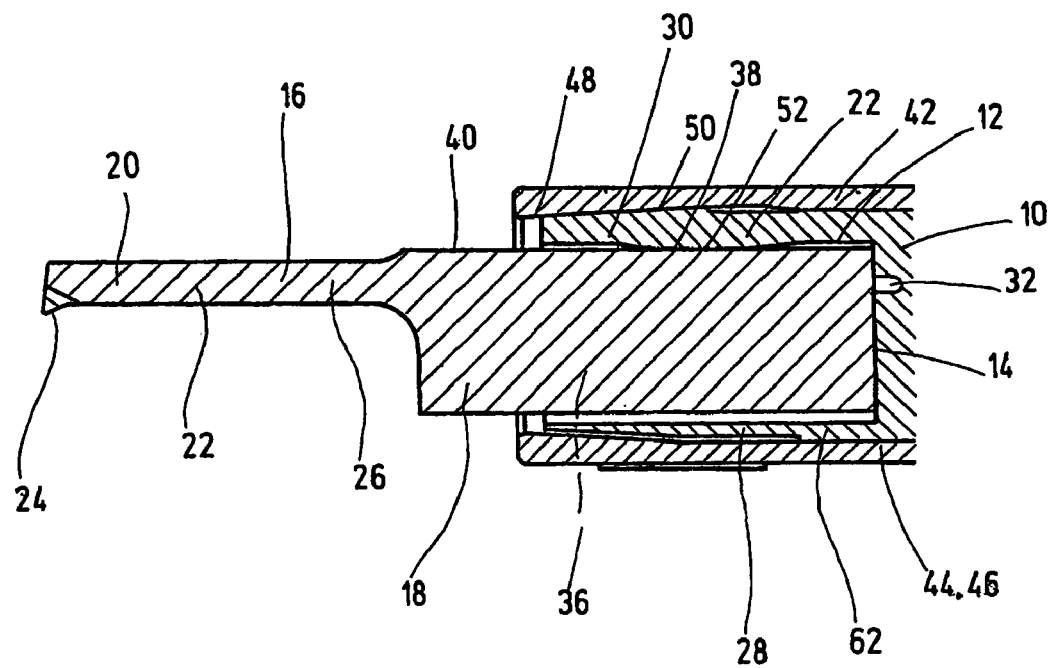
FIG. 4 is a side elevational view in section of the frontal area of the tool of FIG. 1, also on a scale of 4:1.

The tool, according to an embodiment of the present invention, is used for machining by cutting, and is configured in particular as a drill rod. The tool has a holder 10 which, as viewed in FIGS. 1 to 3, in the direction of the rear end of which transition is secured to a fastening shank (not shown in its entirety) by which the tool may be fastened in a machining tool such as a machine tool, drill, or the like. At the opposite end, that is, facing the observer, as viewed in FIGS. 1 to 3, the holder 10 is introduced into a seat 12 (see FIGS. 3 and 4). The front end of the seat communicates with the exterior and is delimited at its other, rear end by a frontal interior surface 14 of the holder 10 (see FIG. 4). The purpose of the seat 12 is to receive a replaceable cutting element 16 having a supporting component 18 which is introduced at least in part into the seat 12 when in the fastened state (see FIGS. 1 and 2). At its opposite end, the cutting element 16 has a machining component 20. It is possible to fasten the supporting component 18 in the seat 12 by a fastening component 22, as is explained in greater detail in what follows. The cutting element 16, configured as a hard metal tool, has on the front end of its machining component 20 a cutting edge 24 which is integrated with the supporting component 18 by a shaft component 26. The shaft component 26 is mounted in the area of the upper edge of the supporting component 18 of the cutting element 16. A cutting element of this kind is known in the state of the art (for example, see DE 100 52 016 A1 referred to in the foregoing).

As shown particularly in FIG. 3, the seat 12 has, on the front end of the holder 10, a support area 28 and, as viewed in the direction of FIG. 3, opposite it an adjustment area 30. The two areas 28, 30 may be moved toward or away from each other for a process of fastening or replacement of the cutting element 16 by the fastening component 22. For the purpose of forming the support 28 and adjustment 30 areas, the seat 12 is slotted in the direction of the fastening shank of the holder 10. Two slots 32 are made as longitudinal slots which extend in a common plane transversely to the longitudinal axis of the holder 10 and reaching the same depth in the holder 10. Elastic relative movement of the two areas 28, 30 is made possible by the two slots 32.

The support area 28 has mutually convergent support surfaces 34 (see FIG. 3) which hypothetically taper downward as viewed in the direction of FIG. 3. The respective support surfaces 34 may be brought into contact with convergent contact surfaces 36 on the supporting component 18 (see FIGS. 1 and 2). The adjustment area 30 in turn has an adjustment surface 38, which extends transversely to the support surfaces 34 of the support area 28, and thus, may act in a clamping situation on another contact surface 40 on the supporting component 18 of the cutting element 16.

The fastening component 22 has a more or less cylindrical fastening sleeve 42 with internal threading 44 (see FIG. 4), which threading may in the associated area be screwed onto external threading 46 of the holder 10. The front end of this external threading 46 (see FIG. 3) extends through the two opposite slots 32 of the seat 12. As FIG. 4 also shows, after it has been screwed on, the fastening sleeve forms a clamping surface 48 convergently tapering in the direction of the machining component 20 of the cutting element 16. This clamping surface 48 interacts with a correspondingly tapering circumferential surface 50 of the seat 12 which is engaged in the slots 32 of the seat 12. This applies only if a clamping force is applied by the fastening sleeve 42 after it has been fastened to the upper side of the supporting component 18 of the cutting element 16 by the adjustment surface 38 which extends forward as a blade. If the fastening sleeve 42 is correspondingly released or screwed from the holder 10, the adjustment surface 38 of the upper side of the machining component 20 of the cutting element 16 is released as a result of the elastic restoring action of the adjustment area 30. Thus, the circumferential surface 50 also moves with it. The supporting component 18 is correspondingly freed in the released state, and the cutting element 16 may be removed from the seat 12 for the purpose of replacing the cutting element 16 with a new one if it has undergone wear. The clamping forces are then again applied as a result of rescrewing of the fastening sleeve 42 onto the associated holder 10, and the cutting element 16 is accordingly fastened in the seat 12.

It is also shown in FIG. 4 that at least the interior surface 52 of the adjustment area 30 and accordingly a part of the adjustment surface 38 that faces the supporting component 18 is configured to be crowned to form a convex clamping surface, at least in the longitudinal direction of the tool. The clamping forces applied to the cutting element 16 may thus be increased in this way in the fastening situation. In addition, centering of the introduction of force in the longitudinal direction of the tool when the holder 10 is in the machining situation may also be effected.

Figure 5:
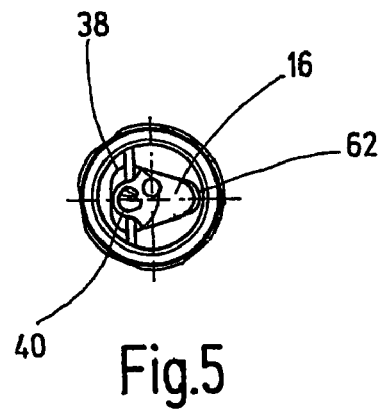
FIG. 5 is an end plan view, on a scale of 4:1, of the front of the tool of FIG. 1.

As shown particularly in FIG. 2, not only does the fastening sleeve 42 rest by its central area by its internal threading 44 on the external threading 46 of the seat 12, but the fastening sleeve 42 is also supported by its two free ends, both on the front external circumference 54 of the seat and in the rear area on the external circumference of the holder 10, specifically, in the area of a recessed annular surface 56. The more or less corresponding areas 54, 46, and 56 (see FIG. 2) of the external circumference are separated from each other in the axial direction by corresponding annular recesses 58. The fastening forces thus received by the fastening sleeve 42 may accordingly be introduced into and diverted from the holder 10, free over large areas of canting and tilting. In addition, as is shown in FIG. 1, the fastening sleeve 42 may have a grip 60 permitting manual operation, but also be modified for use of a hexagon socket-screw wrench or the like not shown. By preference, however, the tool of the present invention is configured so that the fastening sleeve 42 may be manually screwed on or off the holder 10. As is shown in FIG. 5, the adjustment surface 38 is curved as viewed from the front of the tool in the direction of the seat 12 so as to be concave. The other contact surface 40 of the supporting component 18 of the cutting element 16 is in this area curved to be more greatly convex than the concave curvature of the adjustment surface 38.

In addition to the crowned configuration of the blade-like adjustment area 30 already referred to and illustrated in FIG. 4, linear introduction of force is thus achieved by the clamping described in the foregoing of the holder 10. The cutting element 16 may be introduced by its supporting component 18 into the wedge-shaped seat of the support area 28 and is there self-adjusted.

Provision is also made such that the two convergent support surfaces 34 of the support area 28 are interconnected at their ends facing each other by a connecting area 62. The wall thickness of connecting area 62 is smaller than the wall thicknesses selected for the support area 28 in the area of its support surfaces 34. Support surfaces 34 also are stepped by the connecting area 62 so that, as is to be seen as viewed in the direction of FIG. 5, the cutting element 16 is supported at the lower end only on the wall side by the support surfaces 34 and not by the upper side of the rounded connecting area 62 at this point. This permits reliable centering of the cutting element 16 by its supporting component 18 in the seat 12. At the same time, this yields an elastic wedge connection, since the connecting area 62 offsets slightly elastic processes of pressing the supporting component 18 into the wedge-shaped support surfaces 34. This is additionally supported by the circumstance that the seat 12 (see FIG. 5), as viewed in cross-section, is shown to be formed to the extent more or less of two-thirds by the support area 28 and to the extent of one-third by the adjustment area 30.

If it is desired to replace the cutting element 16 as shown in FIG. 1 after it has become worn, the fastening component 22 is released by screwing the fastening sleeve 42 from the holder 10 until the clamping on the conical guide of the fastening sleeve 42 is loosened. The cutting element 16 may then be removed by its supporting component 18 from the seat 12 and a new machining tool in the form of the cutting element 16 is inserted into the seat 12 until the rear end of the supporting component 18 comes into contact with the front interior surface 14 of the seat 12 of the holder 10. The fastening sleeve 42 is then screwed back onto the holder 10 in the opposite direction and the adjustment area 30 is clamped against the support area 28 as a result of the tapered configuration between the inside of the fastening sleeve 42 and outer circumferential side of support and adjustment area 28, 30. In this way, the supporting component 18 of the cutting element 16 is fastened by clamping along surface areas triangular in cross-section facing each other. In the fastened situation, the cutting element 16 is reliably and positively centered. In addition, even in machining by cutting, in which high machining forces are dissipated by the cutting edge 24 into the shaft component 26 and then into the supporting component 18, vibrations no longer arise. This contributes to high-precision machining with the tool.

While one embodiment has been chosen to illustrate the invention, it will be understood by those skilled in the art that various changes and modifications can be made therein without departing from the scope of the invention as defined in the appended claims.

What is claimed is:

1. A tool for cutting machinery, comprising:
    a replaceable cutting element having a supporting component with first converging contact surfaces and with a second contact surface on said supporting component, and having a machining component;
    a holder having a first end with a fastening shank and a second end with a seat receiving said supporting component;
    a fastening component for fastening said supporting component in said seat, said fastening component including a support area and an adjustment area relatively movable toward and away from one another for fastening or replacing said cutting element;
    slots in said seat extending in a direction of said fastening shank to form said support area and said adjustment area and to allow elastic relative movement therebetween, one side of said slots communicating with an exterior;
    support surfaces on said support area converging toward one another and engageable with said first contact surfaces, said support surfaces and said first contact surfaces being correspondingly convergent;
    an adjustment surface on said adjustment area extending transversely to said support surfaces and engageable with said second contact surface; and
    a fastening sleeve having internal threading screwed on external threading on said holder and having a clamping surface narrowing and converging toward said machining component, said external threading communicating with said slot, said clamping surface interacting with a corresponding narrowing circumferential surface of said seat through which said slots extend to move said support area and said adjustment area toward one another to clamp said supporting component therebetween.

2. A tool according to claim 1 wherein
    said machining component is a drill rod.

3. A tool according to claim 1 wherein
    said adjustment area comprises an interior surface facing said supporting component and being crowned to form a convex clamping surface in a longitudinal direction thereof.

4. A tool according to claim 1 wherein
    said fastening sleeve comprises a central area resting on said external threading via said internal threading and on a front external circumferential surface of said seat and a front area of said holder at free ends of said fastening sleeve.

5. A tool according to claim 1 wherein
    said adjustment surface is curved and concave; and
    said second contact surface is curved, is more greatly curved convexly than said adjustment surface, and is engaged by said adjustment surface.

6. A tool according to claim 1 wherein
    said support surfaces are connected along adjacent edges thereof by a connecting area, said connecting area having a wall thickness less than wall thicknesses of said support surfaces.

7. A tool according to claim 1 wherein
    said seat in cross section has two-thirds formed by said support area and one-third formed by said adjustment area.

8. A tool for cutting machinery, comprising:
    a replaceable cutting element having a supporting component with first converging contact surfaces and with a second contact surface on said supporting component, and having a machining component;
    a holder having a first end with a fastening shank and a second end with a seat receiving said supporting component;
    a fastening component for fastening said supporting component in said seat, said fastening component including a support area and an adjustment area relatively movable toward and away from one another for fastening or replacing said cutting element;
    slots in said seat extending in a direction of said fastening shank to form said support area and said adjustment area and to allow elastic relative movement therebetween, one side of said slots communicating with an exterior;
    support surfaces on said support area converging toward one another and engageable with said first contact surfaces, said support surfaces and said first contact surfaces being correspondingly convergent;
    an adjustment surface on said adjustment area extending transversely to said support surfaces and engageable with said second contact surface; and
    a fastening sleeve having internal threading screwed on external threading on said holder, said external threading communicating with said slot, said fastening sleeve including a central area resting on said external threading via said internal threading and on a front external circumferential surface of said seat and a front area of said holder at free ends of said fastening sleeve.

9. A tool according to claim 8 wherein
    said front external circumferential surface, said external threading and a front area of said holder are separated from each other in an axial direction by annular recesses.

10. A tool according to claim 8 wherein
    said adjustment surface is curved and concave; and
    said second contact surface is curved, is more greatly curved convexly than said adjustment surface, and is engaged by said adjustment surface.

11. A tool according to claim 8 wherein
    said support surfaces are connected along adjacent edges thereof by a connecting area, said connecting area having a wall thickness less than wall thicknesses of said support surfaces.

12. A tool according to claim 8 wherein
    said seat in cross section has two-thirds formed by said support area and one-third formed by said adjustment area.

13. A tool for cutting machinery, comprising:
a replaceable cutting element having a supporting component with first converging contact surfaces and with a second contact surface on said supporting component, and having a machining component;
a holder having a first end with a fastening shank and a second end with a seat receiving said supporting component;
a fastening component for fastening said supporting component in said seat, said fastening component including a support area and an adjustment area relatively movable toward and away from one another for fastening or replacing said cutting element;
slots in said seat extending in a direction of said fastening shank to form said support area and said adjustment area and to allow elastic relative movement therebetween, one side of said slots communicating with an exterior;
support surfaces on said support area converging toward one another and engageable with said first contact surfaces, said support surfaces and said first contact surfaces being correspondingly convergent;
a curved and concave adjustment surface on said adjustment area extending transversely to said support surfaces and engageable with said second contact surface, said second contact surface being curved, being more greatly curved convexly than said adjustment surface and being engaged by said adjustment surface; and
a fastening sleeve having internal threading screwed on external threading on said holder, said external threading communicating with said slot.

14. A tool according to claim 13 wherein
said support surfaces are connected along adjacent edges thereof by a connecting area, said connecting area having a wall thickness less than wall thicknesses of said support surfaces.

15. A tool according to claim 13 wherein
said seat in cross section has two-thirds formed by said support area and one-third formed by said adjustment area.

16. A tool for cutting machinery, comprising:
a replaceable cutting element having a supporting component with first converging contact surfaces and with a second contact surface on said supporting component, and having a machining component;
a holder having a first end with a fastening shank and a second end with a seat receiving said supporting component;
a fastening component for fastening said supporting component in said seat, said fastening component including a support area and an adjustment area relatively movable toward and away from one another for fastening or replacing said cutting element;
slots in said seat extending in a direction of said fastening shank to form said support area and said adjustment area and to allow elastic relative movement therebetween, one side of said slots communicating with an exterior;
support surfaces on said support area converging toward one another and engageable with said first contact surfaces, said support surfaces and said first contact surfaces being correspondingly convergent, said support surfaces being connected along adjacent edges thereof by a connecting area, said connecting area having a wall thicknesses less than wall thicknesses of said support surfaces;
an adjustment surface on said adjustment area extending transversely to said support surfaces and engageable with said second contact surface; and
a fastening sleeve having internal threading screwed on external threading on said holder, said external threading communicating with said slot.

17. A tool according to claim 16 wherein
said seat in cross section has two-thirds formed by said support area and one-third formed by said adjustment area.

18. A tool for cutting machinery, comprising:
a replaceable cutting element having a supporting component with first converging contact surfaces and with a second contact surface on said supporting component, and having a machining component;
a holder having a first end with a fastening shank and a second end with a seat receiving said supporting component;
a fastening component for fastening said supporting component in said seat, said fastening component including a support area and an adjustment area relatively movable toward and away from one another for fastening or replacing said cutting element, said seat in cross section having two-thirds formed by said support area and one-third formed by said adjustment area;
slots in said seat extending in a direction of said fastening shank to form said support area and said adjustment area and to allow elastic relative movement therebetween, one side of said slots communicating with an exterior;
support surfaces on said support area converging toward one another and engageable with said first contact surfaces, said support surfaces and said first contact surfaces being correspondingly convergent;
an adjustment surface on said adjustment area extending transversely to said support surfaces and engageable with said second contact surface; and
a fastening sleeve having internal threading screwed on external threading on said holder, said external threading communicating with said slot.

* * * * *